United States Patent
Bakhmutsky et al.

(10) Patent No.: US 6,266,373 B1
(45) Date of Patent: Jul. 24, 2001

(54) PIXEL DATA STORAGE SYSTEM FOR USE IN HALF-PEL INTERPOLATION

(75) Inventors: Michael Bakhmutsky, Spring Valley; Karl Wittig, New York, both of NY (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/094,828

(22) Filed: Jun. 15, 1998

(51) Int. Cl.[7] .................................................. H04N 7/36
(52) U.S. Cl. ........................................................ 375/240.17
(58) Field of Search ................... 375/240.17, 240.15, 375/240.16, 240.12; H04N 7/36

(56) References Cited

U.S. PATENT DOCUMENTS 5,208,875 * 5/1993 Virtue et al. ..................... 382/260
5,539,467 * 7/1996 Song et al. ....................... 375/240.15
6,160,570 * 12/2000 Sitnik .................................. 348/1

OTHER PUBLICATIONS

PHA 23,389, U.S. Patent Application Ser. No. 09/062,939, filed: Apr. 20, 1998.
PHA 23,390, U.S. Patent Application Ser. No. 09/062,940, filed: Apr. 20, 1998.

* cited by examiner

*Primary Examiner*—Howard Britton
(74) *Attorney, Agent, or Firm*—Russell Gross

(57) ABSTRACT

A system for interpolating half-pels from a pixel array stores pixel data for each pixel in one of a plurality of different memory areas based on a location of the pixel within the pixel array, and determines a specific address in each one of the plurality of memory areas based on a target pixel in the pixel array. The system determines each specific address based on a location of the target pixel in the pixel array. The system also reads, from each the plurality of memory areas, pixel data from determined specific addresses and determines a value of at least one half-pel for the target pixel based on the read pixel data.

16 Claims, 11 Drawing Sheets

PIXEL DATA STORAGE SYSTEM FOR USE IN HALF-PEL INTERPOLATION

BACKGROUND OF THE INVENTION

1. Field of the Invention

The present invention is directed to a system for determining values of half-pels from a reference frame of pixels. The invention has particular utility in connection with motion compensation performed during decoding of half-pel encoded video data.

2. Description of the Related Art

Video coding systems, such as motion picture experts group (hereinafter "MPEG") coding, code video data using motion vectors. These motion vectors define movement of an object (e.g., a macroblock) in the video data from a reference, or anchor, frame to a current frame. Each motion vector consists of a horizontal, or "x", component and a vertical, or "y" component, and is the representation of the distance that the object has moved in the time between the reference frame and the current frame.

In some coding systems, motion vectors are restricted to integer values. In these coding systems, the values of pixels in the current frame are specified in terms of values of actual pixels in the reference frame. This type of coding is known as full-pel (i.e., full-pixel) coding. In other coding systems, however, an example of which is MPEG, the motion vectors can have half-integer values. In these systems, the values of pixels in the current frame are not specified solely in terms of pixels that actually exist, but rather can be specified in terms of "virtual" pixels that are interpolated from existing pixels in the reference frame. This type of coding is known as half-pel (i.e., half-pixel) coding.

Motion compensation is a process which can be used to decode video data that has been coded using a half-pel coding system such as MPEG. In the case of half-pel coded video data, the motion compensation process recreates frames of video data from virtual pixels such as those described above. More specifically, in motion compensation of half-pel coded video, a motion vector is used to retrieve data for an object from a reference frame. An object is then generated which is comprised of half-pels that have been interpolated from actual pixels in the reference frame. It is noted that this object is merely a construct that used to improve the motion compensation process, and that the object is not actually displayed. After the object has been generated, a next half-pel motion vector is used to retrieve data from the object, and then to generate and display an actual object at the proper location within the current frame.

The motion compensation process described above interpolates half-pel values by a process which is known in the art as half-pel prediction filtering. Half-pel prediction filtering comprises averaging the value of a pixel corresponding to an integer (i.e., non-half-pel) part of the motion vector with a value of that pixel's nearest neighboring pixel in the direction of increasing motion. In a case that the horizontal component of the motion vector comprises the half-pel part of the motion vector, the averaging is performed with the pixel immediately to the right of the pixel of interest. In a case that the vertical component of the motion vector comprises the half-pel part of the motion vector, the averaging is performed with the pixel immediately below the pixel of interest. In a case where both components comprise a half-pel, the averaging is performed in both the horizontal and vertical directions and with the pixel diagonally adjacent to the pixel of interest.

Thus, as is clear from the foregoing, the motion compensation requires retrieving at least one other pixel, and potentially three other pixels, to interpolate a single half-pel. In the case of a 16×16 pixel MPEG macroblock, for example, this means that an array of 17×17 pixels must be retrieved from a frame memory in order to perform motion compensation on the macroblock. Thus, an extra 33 pixels (the difference between 17×17 pixels and 16×16 pixels), or 13% more pixels, are required to perform motion compensation on the macroblock. Certain modes of MPEG-2 use two motion vectors for each macroblock. In these modes, an array of 18×17 pixels must be retrieved from a frame memory in order to perform motion compensation. Thus, in these cases, an extra 50 pixels, or about 20% more pixels, are required to perform motion compensation on the macroblock. Retrieval and processing of extra pixels in both cases increase the time that it takes to process each macroblock.

More specifically, in conventional decoding systems, all pixels in a particular macroblock are stored sequentially in a frame-store memory. If all of these pixels are processed sequentially, a timing "gap", which is proportionate to the number of extra pixels (e.g., 33 or 50 pixels), will be introduced between every two successive macroblocks in a frame of video data. This timing gap is typically introduced into both luminance and chrominance pixels in the macroblocks. To compensate for the timing gap, conventional MPEG decoders often include a high speed processing clock, together with additional hardware such as data buffers or the like. However, this solution increases the complexity of the timing and control circuitry used in such decoders, and often necessitates the use of an additional clocking frequency in a digital video receiver that includes such a decoder.

Thus, there exists a need for way to perform half-pel interpolation, particularly in the area of motion compensation, which does not introduce substantial timing gaps into video data during decoding, and which does not require significant amounts of additional hardware (e.g., memory) or an overly complex timing and control strategy.

SUMMARY OF THE INVENTION

The present invention addresses the foregoing needs by storing pixel data from a pixel array in one of a plurality of different memory segments based on a location of the pixel data in the pixel array. The invention then reads pixel data from each of the plurality of memory segments and determines a value of at least one half-pel based on the read pixel data. By storing pixel data in different memory segments and reading that pixel data from the different memory segments, it is possible to process pixels non-sequentially and, as a result, reduce any time gaps between consecutive macroblocks in a frame without the use of additional timing mechanisms and overly-complex control circuitry.

Thus, according to one aspect, the present invention is a method of, and a corresponding apparatus for, interpolating half-pels from a pixel array. The invention stores pixel data for each pixel in one of a plurality of different memory areas based on a location of the pixel within the pixel array, and determines a specific address in each one of the plurality of memory areas based on a target pixel in the pixel array. Each specific address is determined in the invention based on a location of the target pixel in the pixel array. The invention also reads, from each of the plurality of memory areas, pixel data from determined specific addresses, and determines a value of at least one half-pel for the target pixel based on the read pixel data.

In preferred embodiments of the invention, the pixel data is read from each one of the memory areas substantially concurrently. By reading the pixel data from each of the memory areas substantially concurrently, the invention reduces processing time by further reducing any timing gaps between consecutive macroblocks in a frame.

In particularly preferred embodiments, the invention is capable of interpolating half-pels by averaging a target pixel with one or more of three adjacent pixels. In these embodiments, an address of each adjacent pixel in its respective memory area is determined based on a location of the target pixel in the pixel array. Specifically, in a case that the target pixel is located in an even row and an even column in the pixel array, a specific address for each of three pixels adjacent to the target pixel is the same as a specific address for the target pixel. In a case that the target pixel is located in an even row and an odd column in the pixel array, a specific address for a pixel vertically adjacent to the target pixel is the same as a specific address of the target pixel, and specific addresses for pixels horizontally and diagonally adjacent to the target pixel comprise a row address of the target pixel and a column address of the target pixel incremented by one. In a case that the target pixel is located in an odd row and an even column in the pixel array, a specific address for a pixel horizontally adjacent to the target pixel is the same as a specific address of the target pixel, and specific addresses for pixels vertically and diagonally adjacent to the target pixel comprise a column address of the target pixel and a row address of the target pixel incremented by one. Finally, in a case that the target pixel is located in an odd row and an odd column in the pixel array, a specific address for a pixel horizontally adjacent to the target pixel comprises a row address of the target pixel and a column address of the target pixel incremented by one, a specific address for a pixel vertically adjacent to the target pixel comprises a column address of the target pixel and a row address of the target pixel incremented by one, and a specific address for a pixel diagonally adjacent to the target pixel comprises a row address of the target pixel incremented by one and a column address of the target pixel incremented by one.

By virtue of the foregoing arrangement, the invention provides a way to access a correct address in each memory area without using complex circuitry or complicated timing strategies.

According to another aspect, the present invention is an apparatus for interpolating half-pels from a pixel array. The apparatus includes a plurality of different memory areas which store pixel data for each pixel in the pixel array based on a location of the pixel within the pixel array, and circuitry which determines a specific address in each of the plurality of memory areas based on an address of a target pixel in the pixel array. The apparatus also includes a plurality of multiplexers for outputting pixel data stored at each specific address in each of the plurality of memory areas, and a half-pel interpolator which determines a value of at least one half-pel for the target pixel based on the pixel data output by the plurality of multiplexers.

According to another aspect, the invention is an apparatus for decoding coded video data. The apparatus includes a plurality of frame-store memory segments, and processing and control circuitry which receives the coded video data, which outputs a specific address of a target pixel in a frame of the coded video data, and which performs, on the coded video data, variable length decoding, inverse scanning, inverse quantization, an inverse discrete cosine transformation, and motion compensation. Circuitry in the apparatus determines a specific address in each of the plurality of frame-store memory segments based on the specific address of the target pixel output by the processing and control circuitry, and a plurality of multiplexers output pixel data stored at each specific address in each of the frame-store memory segments. A half-pel interpolator determines at least one half-pel for the target pixel based on the pixel data output by the plurality of multiplexers and outputs the at least one half-pel to the processing and control circuitry. The processing and control circuitry performs the motion compensation based on the at least one half-pel determined by the half-pel interpolator.

According to another aspect, the invention is a digital television system which includes a tuner that is capable of receiving coded video data over one of a plurality of channels, a video decoder which decodes the coded video data and which outputs uncoded video data, a display processor which generates images based on the uncoded video data, and a video display for displaying the images generated by the display processor. The video decoder includes a plurality of frame-store memory segments, and processing and control circuitry which receives the coded video data, which outputs a specific address of a target pixel in a frame of the coded video data, and which performs, on the coded video data, variable length decoding, inverse scanning, inverse quantization, an inverse discrete cosine transformation, and motion compensation in order to generate the uncoded video data. The video decoder also includes circuitry which determines a specific address in each of the plurality of frame-store memory segments based on the specific address of the target pixel output by the processing and control circuitry, a plurality of multiplexers which output pixel data stored at each specific address in each of the frame-store memory segments, and a half-pel interpolator which determines at least one half-pel for the target pixel based on the pixel data output by the plurality of multiplexers, and which outputs the at least one half-pel to the processing and control circuitry. In the invention, the processing and control circuitry performs the motion compensation based on the at least one half-pel determined by the half-pel interpolator.

The foregoing aspect of the invention incorporates the advantages of the present invention, which were described above, into a digital television system. As a result, the invention provides for a digital television system (or any other MPEG-type system, for that matter) which depicts objects, and in particular object motion, more efficiently and more rapidly than its conventional counterparts.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 8 shows the 4:4:4 MPEG-2 macroblock structure.

FIG. 9 shows the 4:2:2 MPEG-2 macroblock structure.

FIG. 10 shows the 4:2:0 MPEG/MPEG-2 macroblock structure.

FIGS. 11 to 15 show a portion of the pixel array shown in FIG. 4 and are used to explain accessing of different memory segments during half-pel interpolation in accordance with the present invention.

DETAILED DESCRIPTION OF THE PREFERRED EMBODIMENTS

Figure 1:
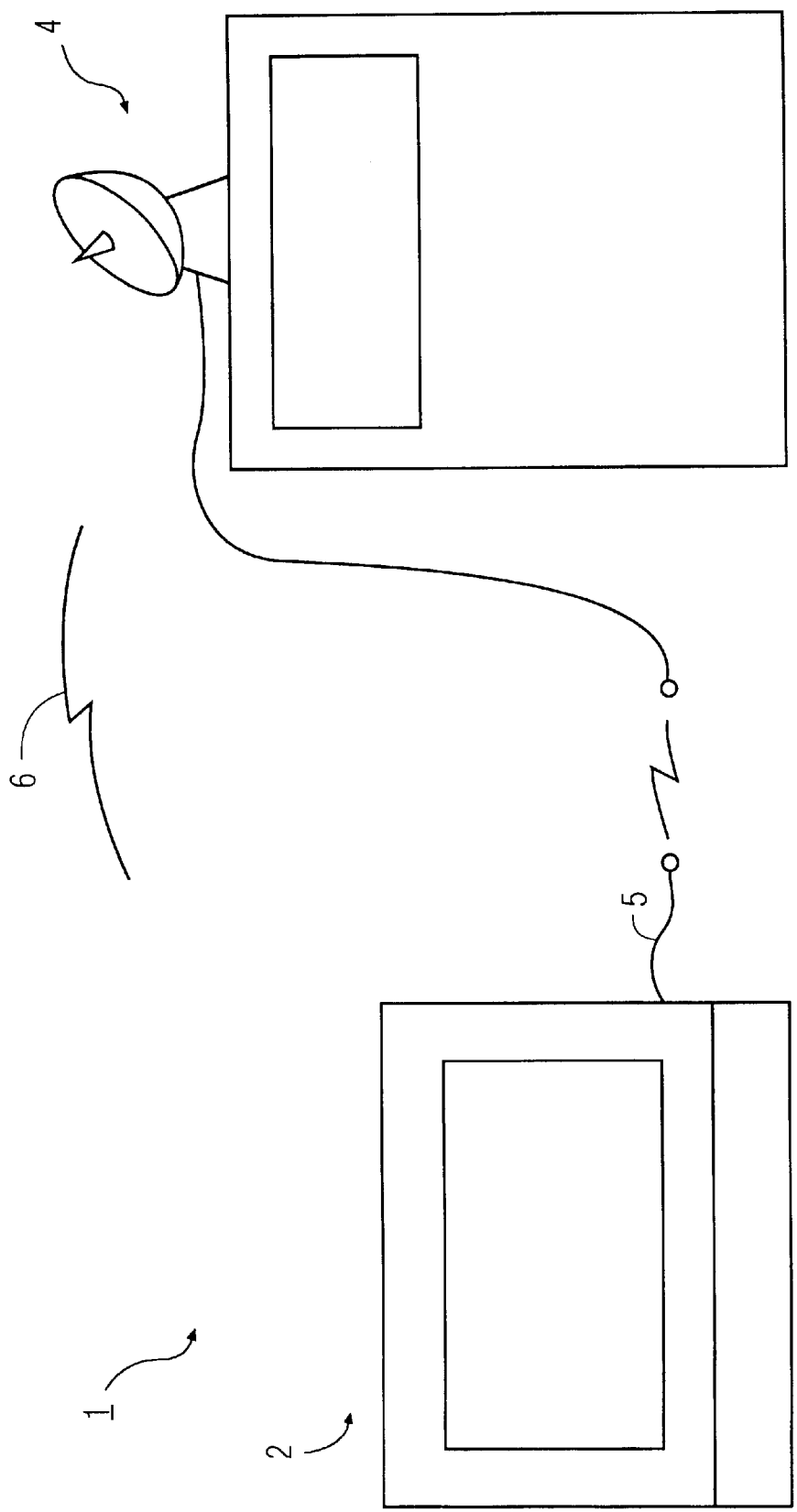
FIG. 1 shows a digital television system in which the present invention may be implemented.

Although the present invention can be used in many different types of video equipment, the preferred embodiment thereof will be described in the context of a digital television system, such as a high-definition ("HDTV") television system. In this regard, FIG. 1 shows an example of a television transmission system in which the present invention may be implemented. As shown in FIG. 1, television system 1 includes digital television 2, transmitter 4, and transmission medium 5. Transmission medium 5 may be a coaxial cable, fiber-optic cable, or the like, over which television signals comprised of video data, audio data, and control data may be transmitted between transmitter 4 and digital television 2. As shown in FIG. 1, transmission medium 5 may include a radio frequency (hereinafter "RF") link, or the like, between portions thereof. In addition, television signals may be transmitted between transmitter 4 and digital television 2 solely via an RF link, such as RF link 6.

Transmitter 4 is located at a centralized facility, such as a television station or studio, from which the television signals may be transmitted to users' digital televisions. These television signals comprise video data for a plurality of frames, together with corresponding audio data. In the invention, this video and audio data is coded prior to transmission. A preferred coding method for the audio data is AC3 coding. A preferred coding method for the video data is MPEG-2; however, MPEG (i.e., MPEG-1) or other digital video coding techniques can be used as well. In this regard, MPEG-2 coding includes a variety of different modes and frame structures. For the sake of clarity, the first embodiment described herein will focus on MPEG-2 frame prediction for MPEG-2 frame structured video (i.e., a progressive, meaning non-interlaced, array of pixels).

As background, MPEG-2 coding is performed on a frame of video data by dividing the frame into macroblocks of 16×16 pixels, each having a separate quantizer scale value associated therewith. Motion estimation is then performed on the macroblocks, so as to generate motion vectors for objects (i.e., moving images) in respective frames, and thereby reduce the amount of information that must be transmitted per macroblock. The macroblocks are then divided into individual blocks of 8×8 pixels. These 8×8 pixel blocks are each subjected to a discrete cosine transform (hereinafter "DCT") which generates DCT coefficients for each of the 64 pixels therein. DCT coefficients in an 8×8 pixel block are then divided by a corresponding coding parameter, namely a quantization weight. Thereafter, additional calculations are effected on the DCT coefficients in order to take into account the quantizer scale value, among other things. Variable-length coding is then performed on the DCT coefficients, and the coefficients are transmitted according to a pre-specified scanning order, such as zig-zag scanning.

Figure 2:
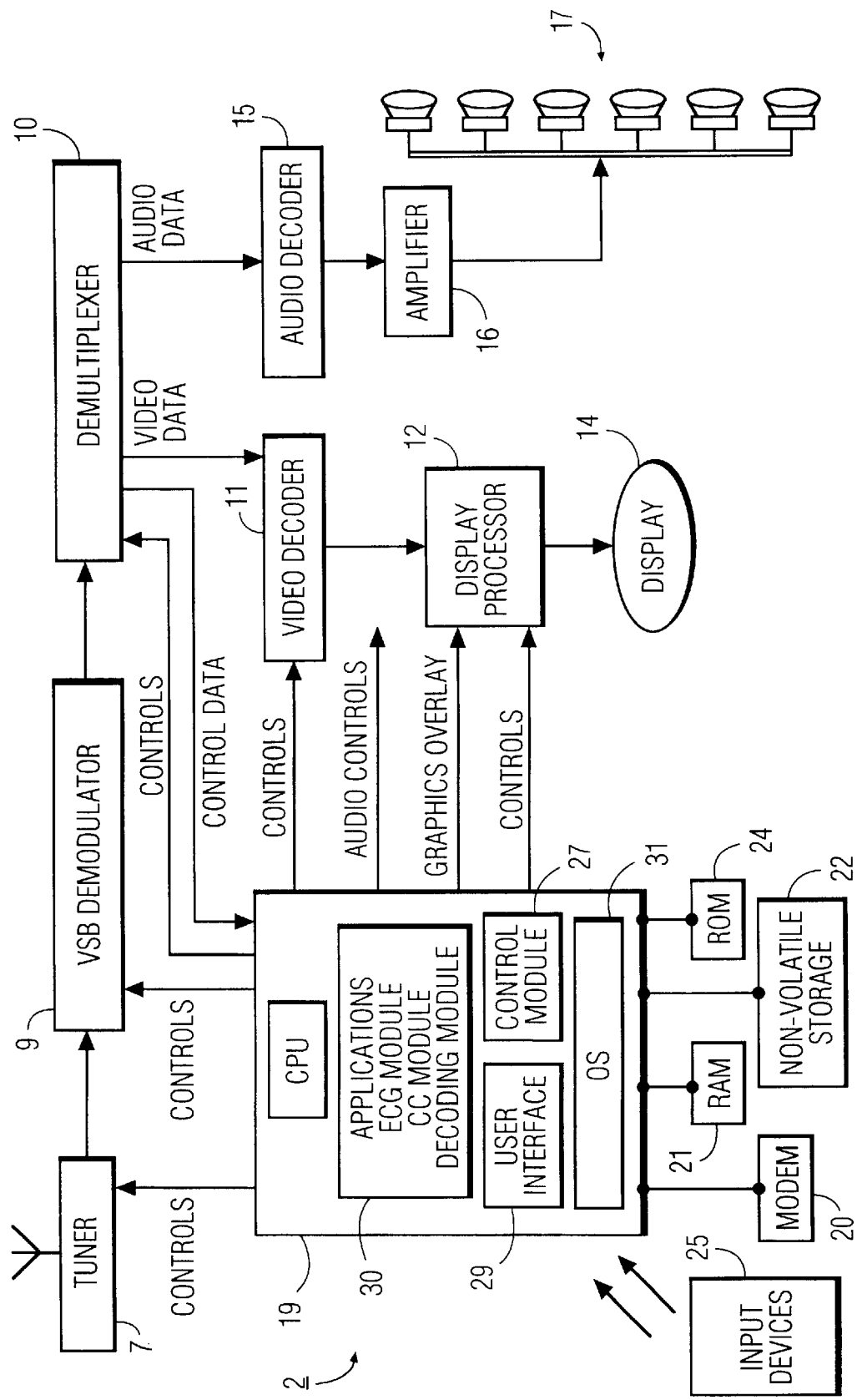
FIG. 2 shows hardware and software used in the digital television (or conventional television and digital settop box) shown in FIG. 1.

FIG. 2 shows a block diagram of digital television 2. As shown in the figure, digital television 2 includes tuner 7, VSB demodulator 9, demultiplexer 10, video decoder 11, display processor 12, video display screen 14, audio decoder 15, amplifier 16, speakers 17, central processing unit (hereinafter "CPU") 19, modem 20, random access memory (hereinafter "RAM") 21, non-volatile storage 22, read-only memory (hereinafter "ROM") 24, and input devices 25. Most of these features of digital television 2 are well-known to those of ordinary skill in the art; however, descriptions thereof are nevertheless provided herein for the sake of completeness.

In this regard, tuner 7 comprises a standard analog RF receiving device which is capable of receiving television signals from either transmission medium 5 or via RF link 6 over a over a plurality of different frequency channels, and of transmitting these received signals. Which channel tuner 7 receives a signal from is dependent upon control signals received from CPU 19. These control signals may correspond to control data received along with the television signals, (see U.S. patent application Ser. No. 09/062,940, entitled "Digital Television System which Switches Channels In Response To Control Data In a Television Signal" (Inventor: Eran Sitnik; Assignee: Philips Electronics North America Corp.; Assignee Reference No.: 700013), the contents of which are hereby incorporated by reference into the subject application as if set forth herein in full). Alternatively, the control signals received from CPU 19 may correspond to data input via one or more of input devices 25. In this regard, input devices 25 can comprise any type of well-known television input device, such as a remote control, keyboard, knob, joystick, etc.

Demodulator 9 receives a television signal from tuner 7 and, based on control signals received from CPU 19, converts the television signal into MPEG-2 digital data packets. These data packets are then output from demodulator 9 to demultiplexer 10, preferably at a high speed, such as 20 megabits per second. Demultiplexer 10 receives the data packets output from demodulator 9 and "desamples" the data packets, meaning that the packets are output either to video decoder 11, audio decoder 15, or CPU 19 depending upon an identified type of the packet. Specifically, CPU 19 identifies whether packets from the demultiplexer include video data, audio data, or control data based on identification data stored in those packets, and causes the data packets to be output accordingly. That is, video data packets are output to video decoder 11, audio data packets are output to audio decoder 15, and control data packets (e.g. remote control signals from the television station) are output to CPU 19.

In an alternative embodiment of the invention, the data packets are output from demodulator 9 directly to CPU 19.

In this embodiment, CPU 19 performs the tasks of demultiplexer 10, thereby eliminating the need for demultiplexer 10. Specifically, in this embodiment, CPU 19 receives the data packets, desamples the data packets, and then outputs the data packets based on the type of data stored therein. That is, as was the case above, video data packets are output to video decoder 11 and audio data packets are output to audio decoder 15. In this embodiment, however, CPU 19 retains control data packets, rather than outputting those packets.

Video decoder 11 decodes video data packets received from demultiplexer 10 (or CPU 19) in accordance with control signals, such as timing signals and the like, received from CPU 19. In preferred embodiments of the invention video decoder 11 is an MPEG-2 decoder; however, any decoder may be used so long as the decoder is compatible with the type of coding used to code the video data. As described in more detail below, video decoder 11 is capable of performing half-pel decoding on half-pel motion coded video data. The details of this process are provided below. For now, suffice it to say that video decoder 11 outputs decoded video data and transmits that decoded video data to display processor 12.

Display processor 12 can comprise a microprocessor, microcontroller, or the like, which is capable of forming images from video data and of outputting those images to display screen 14. In operation, display processor 12 outputs a video sequence in accordance with control signals received from CPU 19 based on the decoded video data received from video decoder 11 and based on graphics data received from CPU 19. More specifically, display processor 12 forms images from the decoded video data received from video decoder 11 and from the graphics data received from CPU 19, and inserts the images formed from the graphics data at appropriate points in the video sequence defined by the images formed from the decoded video data. Specifically, display processor 12 uses image attributes, chroma-keying methods and region-object substituting methods in order to include (e.g., to superimpose the graphics data in the data stream for the video sequence.

The graphics data noted above may correspond to any number of different types of images, such as station logos or the like. Additionally, the graphics data may comprise alternative advertising or the like, such as that described in U.S. patent application Ser. No. 09/062,939, entitled "Digital Television Which Selects Images For Display In A Video Sequence" (Inventor: Fran Sitnik; Assignee: Philips Electronics North America Corp; Assignee Reference No.: 700012) now U.S. patent No. 6,160,570, the contents of which are hereby incorporated by reference into the subject application.

Audio decoder 15 is used to decode audio data packets associated with video data displayed on display screen 14. In preferred embodiments of the invention, audio decoder 15 comprises an AC3 audio decoder; however, other types of audio decoders may be used in conjunction with the present invention depending, of course, on the type of coding used to code the audio data. As shown in FIG. 2, audio decoder 15 operates in accordance with audio control signals received from CPU 19. These audio control signals include timing information and the like, and may include information for selectively outputting the audio data. Output from audio decoder 15 is provided to amplifier 16. Amplifier 16 comprises a conventional audio amplifier which adjusts an output audio signal in accordance with audio control signals relating to volume or the like input via input devices 25. Audio signals adjusted in this manner are then output via speakers 17.

CPU 19 comprises one or more microprocessors which are capable of executing stored program instructions (i.e., process steps) to control operations of digital television 2. These program instructions comprise parts of software modules (described below) which are stored in either an internal memory of CPU 19, non-volatile storage 22, or ROM 24 (e.g., an EPROM), and which are executed out of RAM 21. These software modules may be updated via modem 20 and/or via the MPEG-2 bitstream. That is, CPU 19 receives data from modem 20 and/or in the MPEG-2 bitstream which may include, but is not limited to, software module updates, video data (e.g., graphics data or the like), audio data, etc.

At this point, it is noted that the invention may be implemented either (i) in a digital television system, such as that shown in FIG. 2, in which all control hardware is housed within digital television 2, or (ii) in a digital television system which includes both a conventional television and a digital settop box. In the latter case, video decoder 11, CPU 19 above, or any one or more of the foregoing features of digital television 2, may be housed in the digital settop box, together with a memory that stores executable software modules. In a case that the invention is implemented in a television system which includes a digital settop box, the television is controlled based on control signals from the settop box, and will itself include circuitry for performing necessary control functions as well as video and audio output functions.

FIG. 2 shows examples of software modules which are executable within CPU 19. As shown in FIG. 2, these modules include control module 27, user interface module 29, application modules 30, and operating system module 31. Operating system module 31 controls execution of the various software modules running in CPU 19 and supports communication between these software modules. Operating system module 31 may also control data transfers between CPU 19 and various other components of digital television 2, such as ROM 24. User interface module 29 receives and processes data received from input devices 25, and causes CPU 19 to output control signals in accordance therewith. To this end, CPU 19 includes control module 27, which outputs such control signals together with other control signals, such as those described above, for controlling operation of the various components of digital television 2.

Application modules 30 comprise software modules for implementing various signal processing features available on digital television 2. Application modules 30 can include both manufacturer-installed, i.e., "built-in", applications and applications which are downloaded via modem 20 and/or the MPEG-2 bitstream. Examples of well-known applications that may be included in digital television 2 are an electronic program guide ("EPG") module and a closed-captioning ("CC") module. Applications modules 30 may also include process steps (e.g., a decoding module) which are executable by CPU 19 to implement the video data decoding process described below, including the motion compensation and half-pel interpolation processes of the present invention. In preferred embodiments of the invention however, these processes are performed within video decoder 11. A detailed description of these processes, together with preferred hardware for implementing these processes, is provided below.

In brief, a preferred embodiment of video decoder 11 includes a plurality of frame-store memory segments (i.e., memory areas) and processing and control circuitry which receives coded video data, which outputs a specific address of a target pixel in a frame of the coded video data, and which performs, on the coded video data, variable length decoding, inverse scanning, inverse quantization, inverse DCT processing, and motion compensation. Circuitry in video decoder 11 determines a specific address in each of the plurality of frame-store memory segments based on the specific address of the target pixel output by the processing and control circuitry, and a plurality of multiplexers output pixel data stored at each specific address in each of the frame-store memory segments. A half-pel interpolator determines a value of at least one half-pel for the target pixel based on the pixel data output by the plurality of multiplexers, and the processing and control circuitry performs the motion compensation based on the at least one half-pel determined by the half-pel interpolator.

Figure 3:
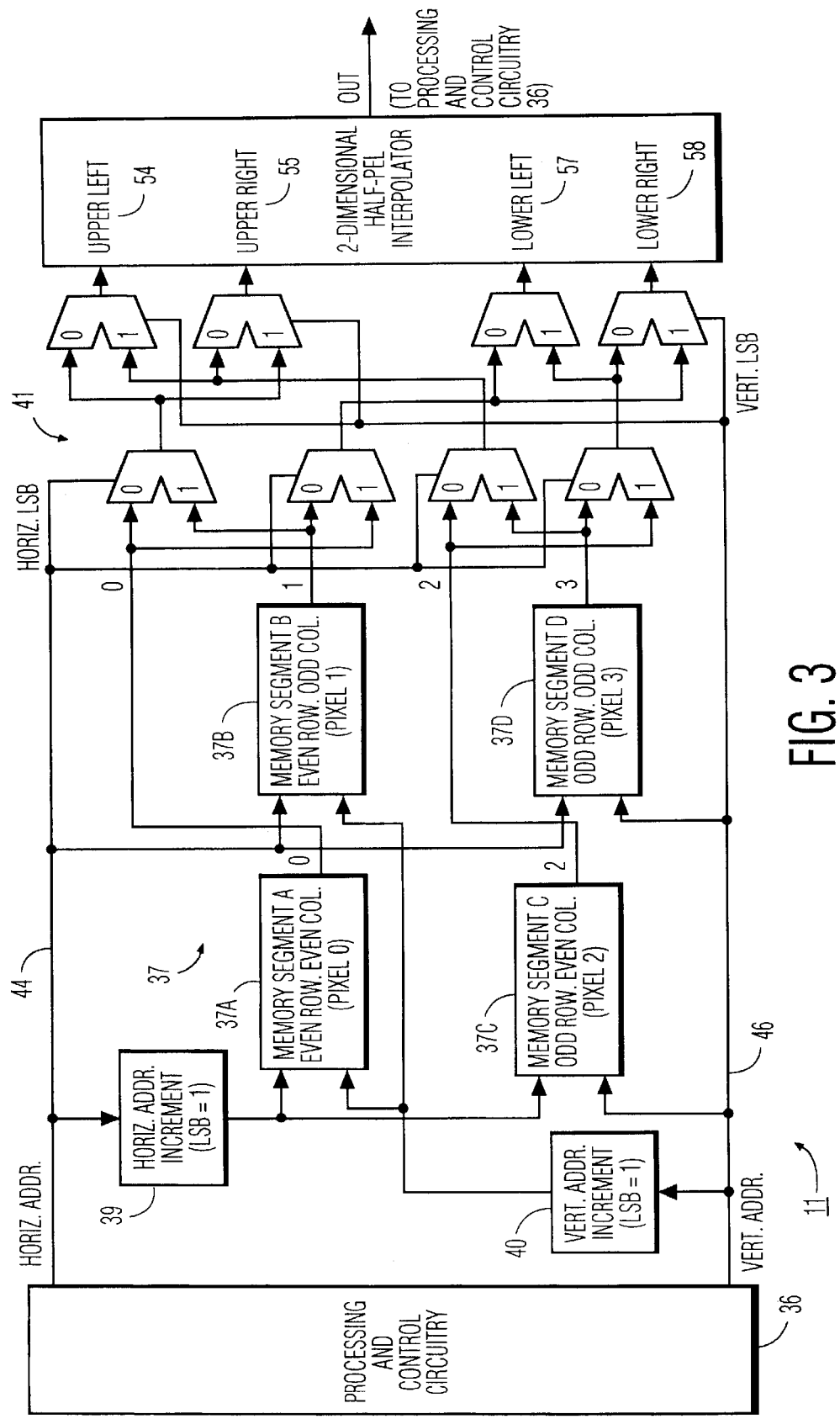
FIG. 3 shows an example of a video decoder which includes the present invention.

FIG. 3 shows a representative hardware configuration for video decoder 11. As shown in FIG. 3, video decoder 11 includes processing and control circuitry 36, plural frame-store memory segments 37, incrementing circuits 39 and 40, plural multiplexers 41, and half-pel interpolator 42. In order to operate in different modes of MPEG-2, additional circuitry, including additional frame-store memory segments, incrementing circuits, multiplexers and a half-pel interpolator, having a configuration identical to that shown in FIG. 3, should be included within the video decoder 11. However, for the sake of clarity, the invention will be described with respect to only those features of video decoder 11 shown in FIG. 3. A detailed description of each of these features of video decoder 11 is provided below.

More specifically, processing and control circuitry 36 can comprise a plurality of discrete hardware components, a microprocessor, a field programmable gate array ("FPGA"), or any other type of circuitry sufficient to perform the video data decoding process described below (i.e., variable-length decoding, inverse scanning, inverse quantization, inverse DCT, and motion compensation). Incrementing circuits 39 and 40 preferably comprise adders or the like, which are capable of adding a value of one to specific addresses on horizontal address bus 44 and vertical address bus 46. In the invention, incrementing circuits 39 and 40 only increment addresses in a case that the least significant bit (hereinafter "LSB") thereof is "1". In a case that the LSBs of the addresses are "0", incrementing circuits 39 and 40 merely transmit the addresses on address buses 44 and 46 without incrementing the addresses. The incremented addresses, along with non-incremented addresses on horizontal address bus 44 and vertical address bus 46, are used to access frame-store memory segments 37 in the manner described below.

Figure 4:
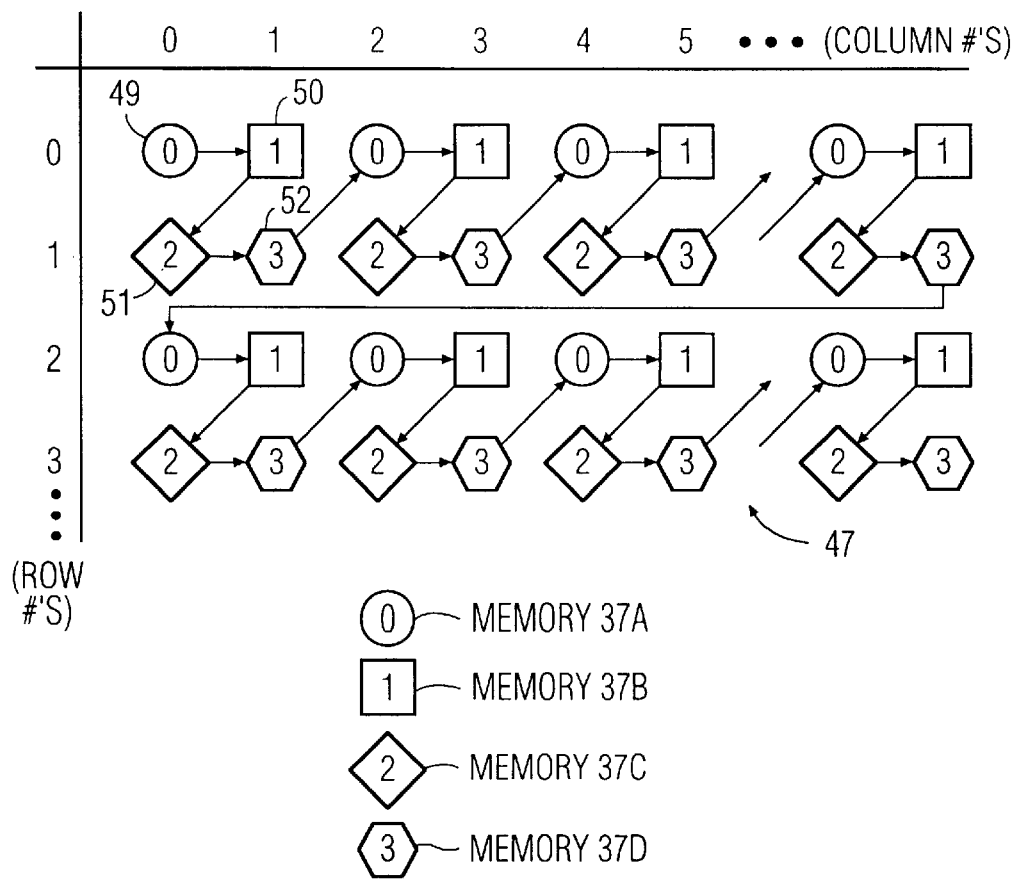
FIG. 4 shows how pixels in a pixel array are stored in different memory segments in the present invention.

Plural frame-store memory segments 37 can comprise separate memories, such as RAMs, within video decoder 11, but preferably comprise separately-addressable segments of RAM or NVRAM. In preferred embodiments of the invention, control logic for video decoder 11 is integrated on the same device that includes the frame-store memories. In any case, frame-store memory segments 37 store data for pixels in a frame of video data based on the locations of those pixels in the frame. For example, for pixel array 47 shown in FIG. 4, memory segment 37A stores all pixels in even rows (e.g., rows 0, 2, 4 . . . ) and even columns, an example of which is pixel "0" 49; memory segment 37B stores all pixels in even rows and odd columns (e.g., columns 1, 3, 5 . . . ), an example of which is pixel "1" 50; memory segment 37C stores all pixels in odd rows and even columns, an example of which is pixel "2" 51; and memory segment 37D stores all pixels in odd rows and odd columns, an example of which is pixel "3" 52. In preferred embodiments of the invention, processing and control circuitry 36 stores video data for pixels in memory segments 37A to 37D in the order shown in FIG. 4.

Each of plural multiplexers 41 is preferably a standard "2-to-1" multiplexer, which outputs a signal from terminal "0" in a case that its input signal is a zero, and which outputs a signal from terminal "1" in a case that its input signal is a one. Plural multiplexers 41 output pixel data stored in specific addresses of plural memory segments 37 to corresponding inputs of half-pel interpolator 42 substantially concurrently. That is, as shown in FIG. 3, half-pel interpolator includes upper left terminal 54, upper right terminal 55, lower left terminal 57, and lower right terminal 58. These terminals correspond to pixels associated with a target pixel (e.g. pixel 47 shown in FIG. 5). For example, upper left terminal 54 receives data for pixel "0" 49 shown in FIG. 5; upper right terminal 55 receives data for pixel "1" 50 shown in FIG. 5; lower left terminal 57 receives data for pixel "2" 51 shown in FIG. 5; and lower right terminal 58 receives data for pixel "3" 52 shown in FIG. 5. The same is true for other sets of pixels. For example, for pixels 99 shown in FIG. 13, of which pixel "3" 52 is the target pixel, upper left terminal 54 receives data for pixel "3" 52 (the upper left pixel in the group of pixels 99), upper right terminal 55 receives data for pixel "2" 85 (the upper right pixel in the group), lower left terminal 57 receives data for pixel "1" 89 (the lower left in the group), and lower right terminal 58 receives data for pixel "0" 91 (the lower right pixel in the group).

Half-pel interpolator 42 comprises a standard two-dimensional half-pel interpolator. Specifically, half-pel interpolator 42 determines values of half-pels in a pixel array, such as that shown in FIG. 5, by averaging pixel data output from at least two of memory segments 37A, 37B, 37C and 37D. Taking pixels "0" 49, "1" 50, "2" 51 and "3" 52 as examples, if a half-pel is to be determined between pixels "0" 49 and "1" 50, half-pel interpolator 42 averages values of pixels "0" 49 and "1" 50 from memory segments 37A and 37B, respectively, and then outputs a half-pel based on the average. Similar processing is performed for determining a half-pel between pixels "0" 49 and "2" 51. For a half-pel between pixels "0" 49, "1" 50, "2" 51, and "3" 52, half-pel interpolator 42 averages values of pixels "0" 49, "1" 50, "2" 51, and "3" 52, and then outputs a half-pel based on the average. In preferred embodiments of the invention, output half-pels are provided to processing and control circuitry 36 for use in motion compensation processing during decoding of the video data.

Figure 6:
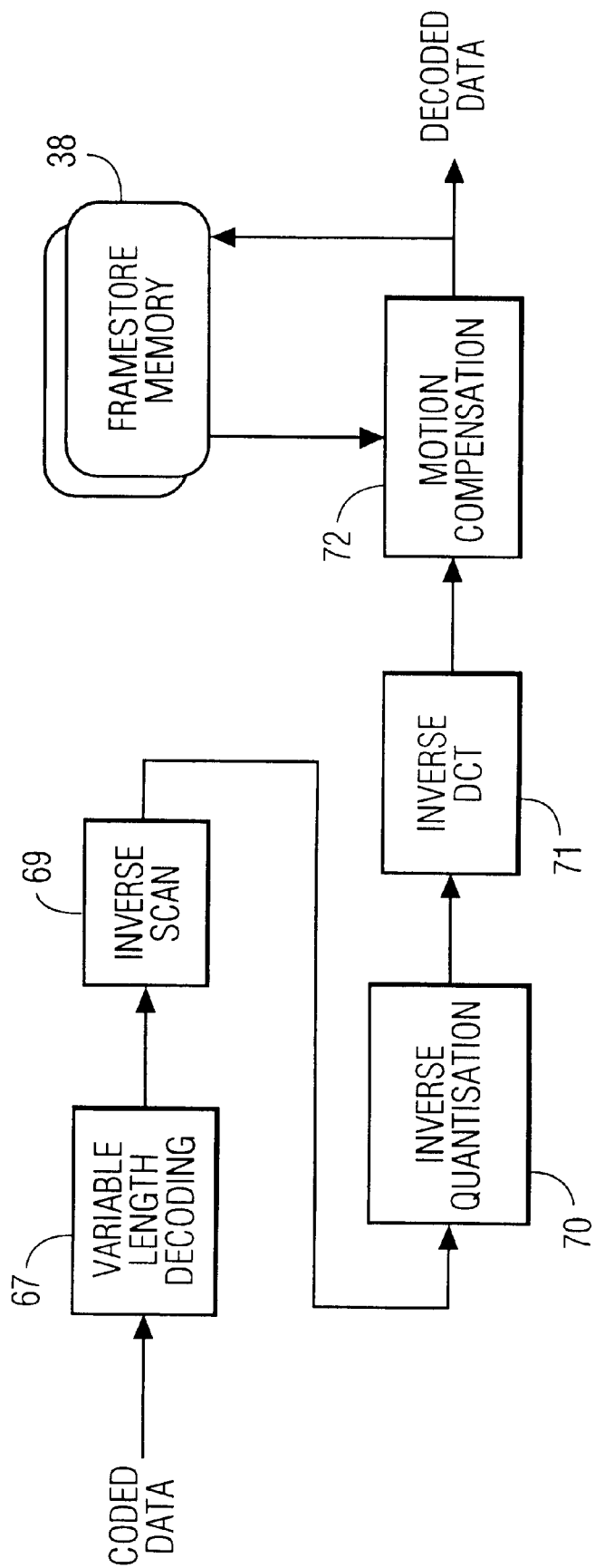
FIG. 6 shows a video data decoding process in which the present invention is used.

In this regard, FIG. 6 is a block diagram showing a process for decoding MPEG-2 (or MPEG-1) coded video data which is performed by video decoder 11. More specifically, as shown in FIG. 6, coded data is input to variable-length decoder block 67, which performs variable-length decoding on the coded video data. Thereafter, inverse scan block 69 reorders the coded video data to correct for the pre-specified scanning order in which the coded video data was transmitted from the centralized location (e.g., the television studio). Inverse quantization is then performed on the coded video data in block 70, followed by inverse DCT processing in block 71. Up to this point, the processing performed by video decoder 11 is standard, meaning that it is well-known to those of ordinary skill in the art of video decoding. On the other hand, motion compensation block 72 (in conjunction with frame-store memories 38) performs motion compensation on the video data output from inverse DCT block 71 in accordance with the half-pel interpolation process of the present invention.

Figure 7:
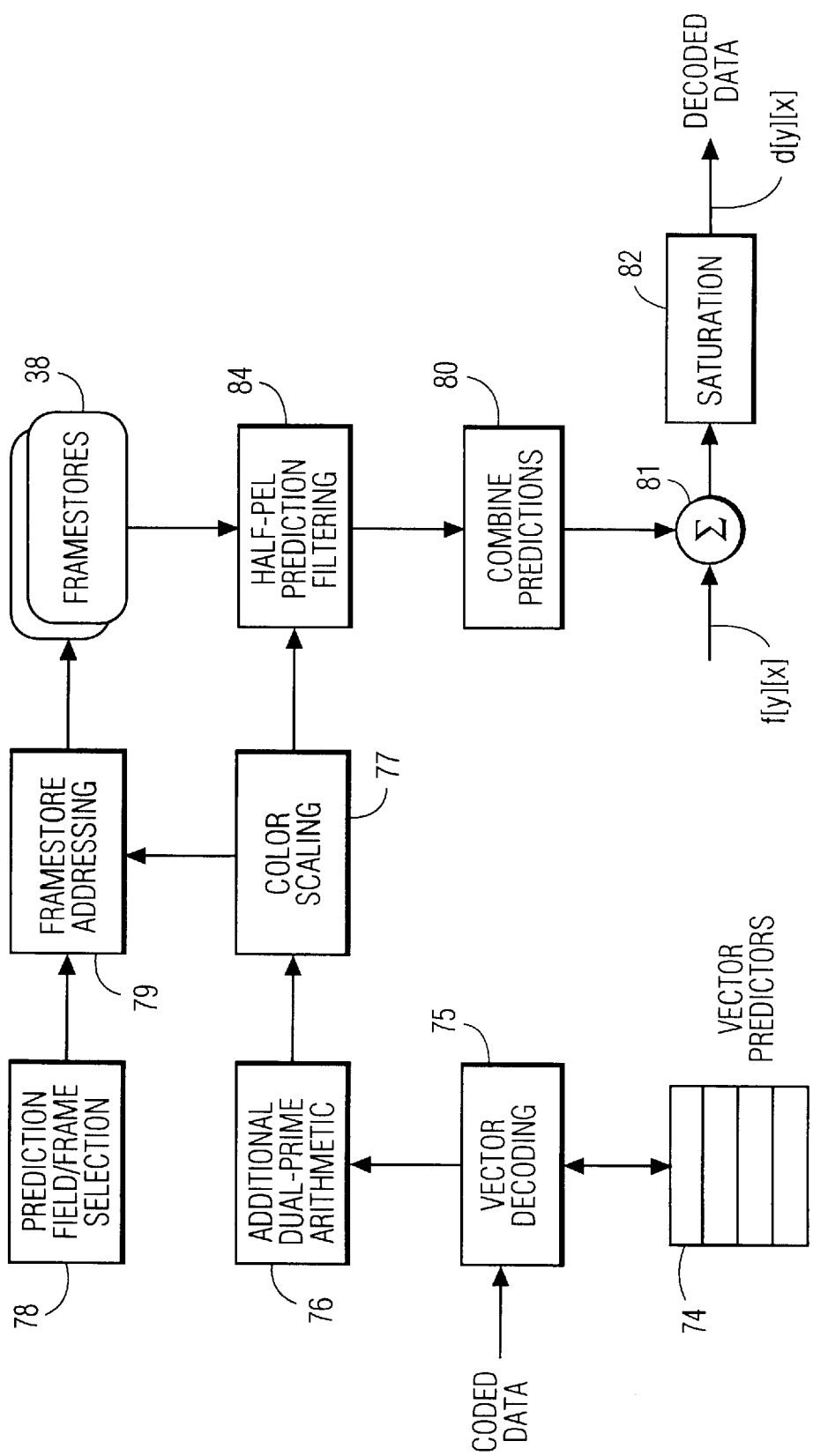
FIG. 7 shows the details of a motion compensation process in the video data decoding process shown in FIG. 6.

FIG. 7 is a block diagram showing the motion compensation process performed in motion compensation block 72. Initially, it is noted that additional dual prime arithmetic block 76 and prediction field/frame selection block 78 are used in embodiments of the present invention, such as the present embodiment, which use MPEG-2 coding, and not with other embodiments of the invention which use MPEG-1 coding.

In preferred embodiments of the invention, processing and control circuitry 36 (see FIG. 3) performs the functions of vector predictors block 74, vector decoding block 75, additional dual-prime arithmetic block 76, color scaling block 77, prediction field/frame selection block 78, frame-store addressing block 79 (in part), combine predictions block 80, summation block 81, and saturation block 82. In addition, circuits 39 and 40, multiplexers 41, and half-pel interpolator 42 perform the functions of frame-store addressing block 79 (in part) and half-pel prediction filtering block 84. Frame-store memories 38 (see also FIG. 6) are memories which includes memory segments 37 shown in FIG. 3. The functions of the blocks noted above are described in more detail below.

More specifically, as shown in FIG. 7, coded data for a frame of video is input into vector decoding block 75 from inverse DCT block 71 (see FIG. 6). Motion vectors in the bitstream of coded data (which are generally Huffman coded) are then predicted from vector predictors block 74, and these predicted motion vectors are transmitted back to vector decoding block 75. Thereafter, vector decoding block 75 decodes motion vectors in the bitstream to obtain an (x, y) pair for each motion vector. Additional dual-prime arithmetic block 76 interpolates additional motion vectors from those provided by vector decoding block 75, if required, and then provides all motion vectors to color scaling block 77.

Color scaling block 77 fills in "missing pixels" for color frames. That is, color (i.e., chrominance) frames may be transmitted at a lower resolution than black-and-white (i.e., luminance) frames. More specifically, MPEG-2 is capable of transmitting video data in either 4:4:4, 4:2:2, or 4:2:0 format. In 4:4:4 format, each macroblock is comprised of equal numbers of luminance ("Y") and chrominance ("Cb" and "Cr") pixels. FIG. 8 shows the 4:4:4 macroblock structure. In 4:2:2 format, each macroblock is comprised of twice the number of Y pixels as each of Cr and Cb pixels. FIG. 9 shows the 4:2:2 macroblock structure. In 4:2:0 format, each macroblock is comprised of four times the number of Y pixels as each of Cr and Cb pixels. FIG. 10 shows the 4:2:0 macroblock structure. In cases where video data is transmitted in 4:2:2 or 4:2:0 format, color scaling block 77 scales motion vectors to account for differences in resolution between chrominance and luminance. Following processing in color scaling block 77, the motion vectors are transmitted to frame-store addressing block 79 and to half-pel prediction filtering block 84. At this point, it is noted that once a motion vector has been determined for a Y macroblock, that same motion vector is used for corresponding Cr and Cb macroblocks after the motion vectors have been color-scaled by color scaling block 77.

Turning to frame-store memory addressing block 79, in a case that a current frame corresponds to an anchor frame (e.g., an intraframe, or "I-frame", or a predictive frame, or "P-frame"), frame-store addressing block 79 stores pixels for that frame in one of frame-store memory segments 37 in frame-store memories 38. Information indicating whether the frame comprises an anchor frame is stored in the MPEG picture header, and is available to each block shown in FIG. 7. Thus, in a case that the current frame comprises an anchor frame, frame-store addressing block 79 stores pixel data for each pixel in a frame (or field) in an appropriate one of plural frame-store memory segments 37 based on a location of that pixel within the pixel array. More specifically, as described above, for the pixel array shown in FIG. 4, frame-store addressing block 79 stores all pixels in even rows and even columns, i.e., all "0" pixels in FIG. 4, in one of frame-store memory segments 37 (namely, frame-store memory segment 37A shown in FIG. 3); stores all pixels in even rows and odd columns, i.e., all "1" pixels in FIG. 4, in another one of frame-store memory segments 37 (namely, frame-store memory segment 37B shown in FIG. 3); stores all pixels in odd rows and even columns, i.e., all "2" pixels in FIG. 4, in another one of frame-store memory segments 37 (namely, frame-store memory segment 37C shown in FIG. 3); and stores all pixels in odd rows and odd columns, i.e., all "3" pixels in FIG. 4, in another one of frame-store memory segments 37 (namely, frame-store memory segment 37D shown in FIG. 3).

In a case that the current frame does not comprise an I-frame, frame-store addressing block 79 is used to access data stored in one or both of frame-store memory segments 37. That is, frame-store addressing block 79 uses motion vectors for the current frame in order to determine an address of a target pixel in frame-store memory segments 37. In this regard, it is noted that the invention may also be used with interlaced video comprised of odd and even fields. To this end, the invention includes prediction field/frame selection block 78. Prediction field/frame selection block 78 determines whether input video data comprises a single progressive frame or odd and even interlaced fields and then provides this information to frame-store addressing block 79. Frame-store addressing block 79 uses this information during accessing of frame-store memory segments in the manner described below in the second embodiment of the invention.

FIGS. 5 and 11 to 15 show how frame-store addressing block 79 addresses pixels stored in the frame-store memory segments. More specifically, FIGS. 5 and 11 to 15 show a portion of pixel array 47 (see FIG. 4) in which all of pixels "0" are stored in memory segment 37A, all of pixels "1" are stored in memory segment 37B, all of pixels "2" are stored in memory segment 37C, and all of pixels "3" are stored in memory segment 37D. Thus, for the pixel array shown in FIGS. 5 and 11 to 15, each pixel in each quadrant of four pixels "0", "1", "2", and "3" is stored in the same address of its respective memory segment. More specifically, for quadrant 60 shown in FIG. 5, each of pixels "0" 49, "1" 50, "2" 51, and "3" 52 is stored in the same address, but in a different memory segment. That is, pixel "0" 49 is stored at the (0,0) address of memory segment 37A, pixel "1" 50 is stored at the (0,0) address of memory segment 37B, pixel "2" 51 is stored at the (0,0) address of memory segment 37C, and pixel "3" 52 is stored at the (0,0) address of memory segment 37D. Likewise, in the next quadrant of four pixels in the pixel array, namely quadrant 61, each pixel therein is stored in the (0,1) address in its respective memory segment. In quadrant 62, each pixel therein is stored in the (1,0) address of its respective memory segment; in quadrant 63, each pixel therein is stored in the (1,1) address of its respective memory segment; and so on.

Frame-store addressing block 79 accesses a target pixel and corresponding adjacent pixels necessary for performing half-pel interpolation by outputting a column address (i.e., a horizontal address) on horizontal address bus 44 and a row address (i.e., a vertical address) on vertical address bus 46. The output column and row addresses correspond to a location of the target pixel in pixel array 47. For example, to access data for target pixel 49 shown in FIG. 5, along with data for adjacent pixels required for half-pel interpolation, processing and control circuitry 36 outputs the address of pixel 49, i.e., (0,0). That is, a "0" is output on horizontal address bus 44 and a "0" is output on vertical address bus 46. This address is then used to access data in all four of memory segments 37. More specifically, since the target pixel is located in an even row and an even column, the LSB of each even address is zero. As a result, incrementing circuits 39 and 40 will not increment addresses from address buses 44 and 46. Therefore, the same address (i.e., the (0,0) address of the target pixel) is used to access data in each of memory segments 37A, 37B, 37C and 37D.

In a case that the target pixel is located in an even row and an odd column in the pixel array, such as pixel "1" 50 shown in FIG. 11, a specific address for a pixel vertically adjacent to the target pixel (i.e., pixel "3" 52) is the same as a specific address of the target pixel, and specific addresses for pixels horizontally and diagonally adjacent to the target pixel (i.e., pixels "0" 84 and "2" 85, respectively) comprise a row address of the target pixel and a column address of the target pixel incremented by one. More specifically, as shown in FIG. 11, pixel "1" 50 has a "(row, column)" address of (0,1), with the "0" being input via vertical address bus 46 and the "1" being input via horizontal address bus 44. Since the row address in this case is "0", i.e., it is even, incrementing circuit 46 will not increment the row address. As a result, the row address for each memory is "0". Regarding the column addresses, in accordance with the invention, the LSB of each column and row address is disregarded during memory addressing. As a result, even though there is a "1" on the column address bus, the column address for memory segments 37B and 37D is "0" (since the LSB of the column address, i.e., "1", has been disregarded). Regarding the column addresses of memory segments 37A and 37C, since the LSB of the column address is "1" (i.e., it is odd), and since that LSB is disregarded thereby leaving the memory address as "0", when incrementing circuit 39 increments the column address, the result is "1" since incrementing circuit 39 is actually adding a "1" to "0" and not to "1". Thus, for memory segments 37A and 37C, the column address is "1".

Figure 5:
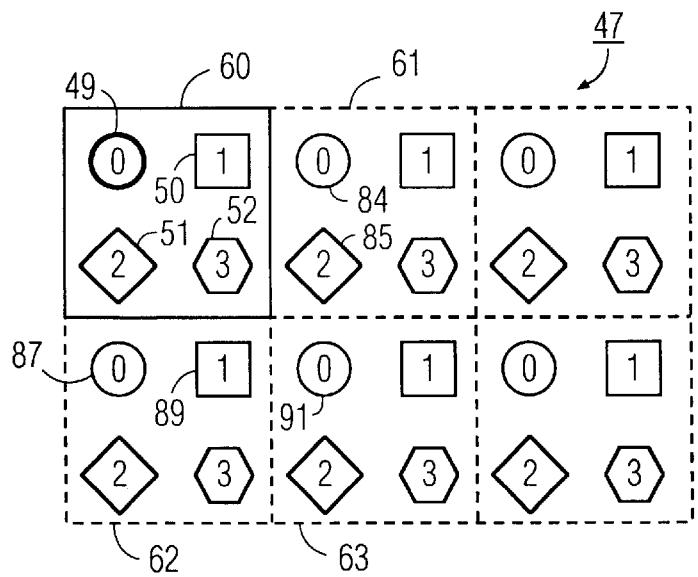
FIG. 5 shows a portion of the pixel array shown in FIG. 4 and is used to explain accessing of different memory segments during half-pel interpolation in accordance with the present invention.

To summarize the foregoing, for the case of pixel "0" 84, memory segment 37A is accessed at address (0,1); for the case of pixel "1" 50, memory segment 37B is accessed at address (0,0); for the case of pixel "2" 85, memory segment 37C is accessed at address (0,1); and for the case of pixel "3" 52, memory segment 37D is accessed at address (0,0). As shown in FIG. 5, this is correct, since pixels "0" 84 and "2" 85 are outside of first quadrant 60 in which all pixels thereof are stored at the (0,0) address of their respective memory segments, and are in quadrant 61 in which all pixels thereof are stored at the (0,1) address of their respective memory segments. In this regard, it is noted that the pixel groups, such as pixel group 99 shown in FIG. 13, do not correspond to quadrants in the sense of quadrant 61, for example. Rather these pixel groups are included to indicate the pixels being input to interpolator 42 for a particular target pixel, and the relative locations thereof.

In a case that the target pixel is located in an odd row and an even column in the pixel array, such as pixel "2" 51 in FIG. 12, a specific address for a pixel horizontally adjacent to the target pixel (i.e., pixel "3" 52) is the same as a specific address of the target pixel, and specific addresses for pixels vertically and diagonally adjacent to the target pixel (i.e., pixels "0" 87 and "1" 89, respectively) comprise a column address of the target pixel and a row address of the target pixel incremented by one. More specifically, as shown in FIG. 12, pixel "2" 51 has a "(row, column)" address of (1,0), with the "1" being input via vertical address bus 46 and the "0" being input via horizontal address bus 44. Since the column address in this case is "0", i.e., it is even, incrementing circuit 39 will not increment the column address. As a result, the column address for each memory is "0". Regarding the row addresses, in accordance with the invention, the LSB of each column and row address is disregarded during memory addressing. As a result, even though there is a "1" on the vertical address bus, the row address for memory segments 37C and 37D is "0" (since the LSB of the row address, i.e., "1", has been disregarded). Regarding the row addresses of memory segments 37A and 37B, since the LSB of the row address is "1" (i.e., it is odd), and since that LSB is disregarded thereby leaving the memory address as "0", when incrementing circuit 40 increments the row address, the result is "1" since incrementing circuit 40 is actually adding a "1" to "0" and not to "1". Thus, for memory segments 37A and 37B, the row address is "1".

To summarize the foregoing, for the case of pixel "0" 87, memory segment 37A is accessed at address (1,0); for the case of pixel "1" 89, memory segment 37B is accessed at address (1,0); for the case of pixel "2" 51, memory segment 37C is accessed at address (0,0); and for the case of pixel "3" 52, memory segment 37D is accessed at address (0,0). As shown in FIG. 5, this is correct, since pixels "0" 87 and "1" 89 are outside of first quadrant 60 in which all pixels thereof are stored at the (0,0) address of their respective memory segments, and are in quadrant 62 in which all pixels thereof are stored at the (1,0) address of their respective memory segments.

Figure 13:
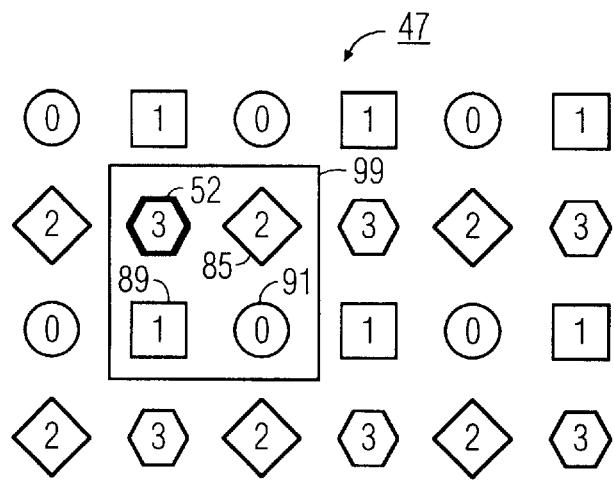

Finally, in a case that the target pixel is located in an odd row and an odd column in the pixel array, such as pixel "3" 52 shown in FIG. 13, a specific address for a pixel horizontally adjacent to the target pixel (i.e., pixel "2" 85) comprises a row address of the target pixel and a column address of the target pixel incremented by one, a specific address for a pixel vertically adjacent to the target pixel (i.e., pixel "1" 89) comprises a column address of the target pixel and a row address of the target pixel incremented by one, and a specific address for a pixel diagonally adjacent to the target pixel (i.e., pixel "0" 91) comprises a row address of the target pixel incremented by one and a column address of the target pixel incremented by one. More specifically, as shown in FIG. 13, pixel "3" 52 has a "(row, column)" address of (1,1), with "1" being input via vertical address bus 46 and "1" being input via horizontal address bus 44. Taking the column addresses first, since the LSB of the column address of the target pixel is disregarded, the column address of memory segments 37B and 37D is zero. In addition, since the LSB of the column address of the target pixel is "1", i.e., it is odd, incrementing circuit 39 will increment the column address. However, since the LSB of the column address of the target pixel is disregarded prior to this incrementing, the resulting incremented column address of memory segments 37A and 37C is "1" (i.e., "0"+"1"). Next, regarding the row addresses, since the LSB of the row address of the target pixel is disregarded, the row addresses of memory segments 37C and 37D are zero. In addition, since the LSB of the row address of the target pixel is "1", i.e., it is odd, incrementing circuit 40 will increment the row address. However, since the LSB of the row address of the target pixel is disregarded prior to this incrementing, the resulting incremented row address of memory segments 37A and 37B is "1" (i.e., "0"+"1").

To summarize the foregoing, for the case of pixel "0" 91, memory segment 37A is accessed at address (1,1); for the case of pixel "1" 89, memory segment 37B is accessed at address (1,0); for the case of pixel "2" 85, memory segment 37C is accessed at address (0,1); and for the case of pixel "3" 52, memory segment 37D is accessed at address (0,0). As shown in FIG. 5, this is correct, since pixels "0" 91, "1" 89, and "2" 85 are outside of first quadrant 60 in which all pixels thereof are stored at the (0,0) address of their respective memory segments (as shown in FIG. 5, pixel "3" 52 is the only one of the four pixels within first quadrant 60). Rather, pixel "1" 89 is in quadrant 62 in which all pixels thereof are stored at the (1,0) address of their respective memory segments; pixel "2" 85 is in quadrant 61 in which all pixels thereof are stored at the (0,1) address of their respective memory segments; and pixel "0" 91 is in quadrant 63 in which all pixels thereof are stored at the (1,1) address of their respective memory segments.

Figure 14:
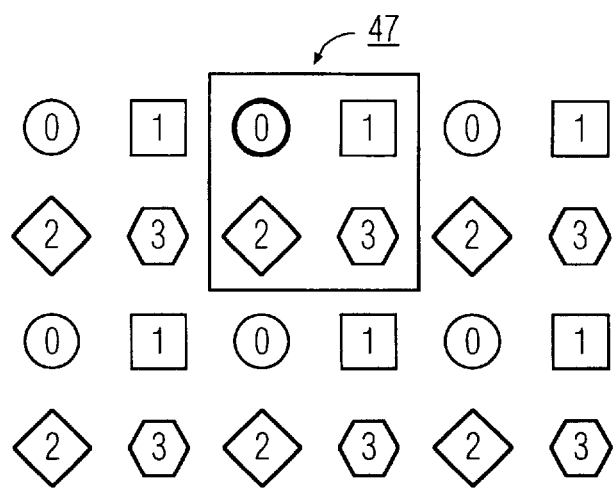
Figure 15:
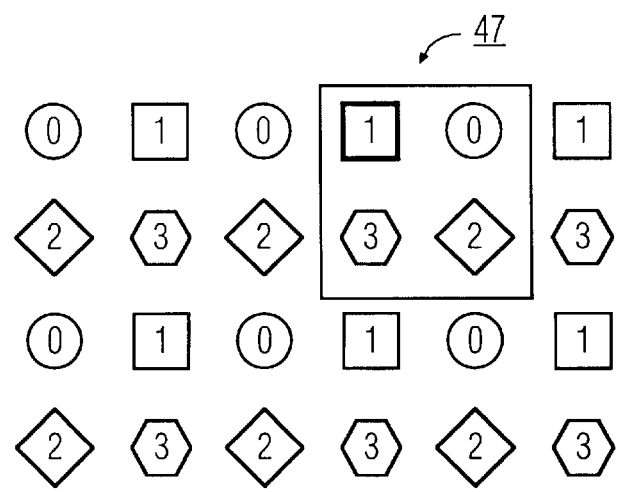

As shown in FIGS. 14 and 15, which correspond to FIG. 5 and 11 respectively, the foregoing process is repeated for target pixels which are outside of first quadrant 60. In this regard, once data for pixels in respective frame-store memories has been accessed, that data is output to half-pel interpolator 42 which, as noted above, performs the functions half-pel prediction filtering block 84. That is, multiplexers 41 output the data to appropriate terminals of half-pel interpolator 42. Half-pel interpolator 42 then interpolates half-pel values by averaging the value of the target pixel with one or more of the other pixels provided to half-pel interpolator 42. Thereafter, half-pel interpolator 42 provides these half-pels to processing and control circuitry 36, which uses the half-pels to reconstruct moving objects in a current frame.

More specifically, returning to FIG. 7, once half-pels have been determined in block 84, processing proceeds to combine predictions block 80. Combine predictions block 80 is operative (i) in cases where MPEG-2's dual prime arithmetic mode is used (for either field prediction or frame prediction), or (2) in a case that a current frame is what is known as a "B-frame", meaning that the frame is determined based on an anchor frame that precedes the B-frame (e.g., an I-frame or a P-frame) and based on a second subsequent anchor frame. Thus, in a case that the current frame is a B-frame, combine predictions block 80 performs processing which generates portions of the current frame based on both the half-pels determined in block 84 and similar half-pels for a subsequent frame. In a case that the current frame is not a "B" frame, combine predictions block 84 merely passes data for the current frame through to summation block 81 without performing any processing thereon.

In a case that the current frame is not an I-frame (e.g., it is a P-frame or a B-frame), pixel data obtained up to this point corresponds only to the difference between the current frame and one or both of the anchor frame(s). Accordingly, in this case, summation block is provided to add pixels from the preceding anchor (I- or P-) frame (i.e., f[y][x]) to the pixels generated during the motion compensation process. Thereafter, processing proceeds to saturation block 82, which "clips" the pixel values so that, for eight-bit pixels, none are outside of a range of specified values, such as 0 to 255 for luminance pixels and –128 to 127 for chrominance pixels. Saturation block 82 then outputs the decoded data d[y][x]. Thereafter, the motion compensation processing of FIG. 7, and the video decoding of FIG. 6, end.

As noted, the invention has been described with respect to the particular case of MPEG-2 frame prediction for frames having a frame picture structure (which, incidentally, is always the case for MPEG-1). In MPEG-2 coding, however, a variety of picture structures and motion compensation modes are available. A description of a second embodiment of the invention which can handle these different motion compensation modes and picture structures is provided below.

In this regard, in MPEG-2, a picture may be transmitted as either a frame picture, in which an entire frame (i.e., all even and odd rows) comprise a single picture structure, or as a field picture, in which each frame comprises two distinctly-transmitted pictures, i.e., a "top" field which consists of even rows of the frame and a "bottom" field which consists of odd rows of the same frame. In addition, MPEG-2 includes a number of motion prediction modes for each of the two allowed picture structures. For field pictures, the three permitted modes are field prediction mode, in which a single motion vector per anchor is used for a current macroblock; "16×8" mode, in which one motion vector per anchor is used for an upper half of the current macroblock and a second motion vector is used for a lower half of the current macroblock; and dual-prime mode, in which one motion vector is used for each of two most-recently transmitted fields. With only a few restrictions, any macroblock in the current field picture may be encoded using any of the above three modes, independently of other macroblocks in the same picture.

For frame pictures there are also three permitted motion prediction modes. These three modes are frame prediction mode, in which a single motion vector per anchor is used for a current macroblock; field prediction mode, in which one motion vector per anchor is used for even rows of the current macroblock and a second motion vector is used for odd rows of the current macroblock; and dual-prime mode in which one motion vector is used for even rows in each field of a most-recently transmitted frame and one motion vector is used for odd rows in each field of the most-recently transmitted frame (for a total of four motion vectors per frame). As was the case above, with only a few restrictions, any macroblock in the current field picture may be encoded using any of the above three modes, independently of other macroblocks in the same picture.

From the foregoing, it is apparent that, in most cases, anchors are referenced as individual fields (either top or bottom) of a composite anchor frame. For example, the 16×8 mode used with field pictures and the dual-prime modes used with field and frame pictures are classified as field prediction modes, as are the explicitly-named field prediction modes used with both field and frame pictures. The only exception to this general rule is the case where the current macroblock is treated as a progressive (i.e., non-interlaced) array of pixels, with no distinction being made between two fields of an anchor frame.

Incorporation of the field prediction modes that comprise all but one of the motion prediction modes supported by MPEG-2 suggests that each of two anchor frame-store memories (e.g., two separately-addressable areas of RAM) be segmented according to constituent (i.e., top and bottom) fields of an MPEG-2 picture. Since accessing of these memory segments depends upon the prediction mode of the current macroblock rather than on the current picture structure, this separation of the anchor frame-store memories will allow the field prediction modes to be supported. Thus, in the context of the present invention, each of four memory segments (e.g., 37 above) in each frame-store memory may be further partitioned into a top field partition and a bottom field partition. The partition appropriate to the current prediction mode can then be selected for all four memory segments.

While the foregoing addresses the problems associated with field prediction in either a field or frame picture, the fact that all even rows of a video frame reside in the top field and all odd rows reside in the bottom field create an additional problem in the case of frame prediction in a frame picture. In this regard, as described above with respect to FIG. 3, the present invention stores even rows of an anchor frame in memory segments 37A and 37B, and odd rows of the anchor frame in memory segments 37C and 37D. Since this does not comport with partitioning the memory segments into top and bottom field components comprised of odd and even frame rows, a different memory configuration may be used by the invention to handle all types of field and frame prediction.

Figure 16:
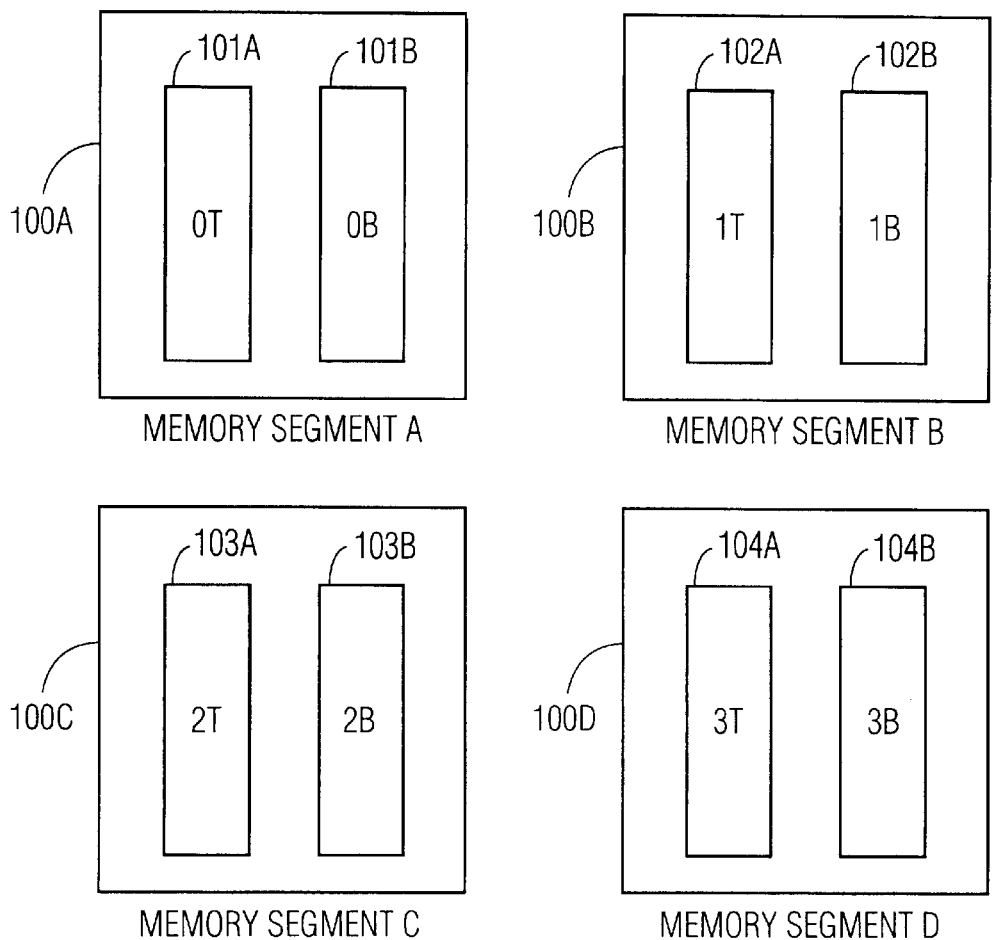
FIG. 16 shows a memory configuration used for field prediction in MPEG-2 coded data.

FIG. 16 shows a memory configuration used for field prediction. In FIG. 16, the present invention partitions each anchor frame into separate top and bottom fields, each of which is, in turn, partitioned into four segments within each field component. These four segments comprise (i) pixels in even rows and even columns, (ii) pixels in even rows and odd columns, (iii) pixels in odd rows and even columns, and (iv) pixels in odd rows and odd columns. Each segment/field combination is then stored in an appropriate memory segment.

More specifically, as shown in FIG. 16, the invention divides each of memory segments 100A, 100B, 100C and 100D into top ("T") and bottom ("B") partitions. The invention then stores the pixel data so that memory segment 100A, partition "0T" 101A stores pixels in the top field (i.e., even rows of the frame) which are in even rows and even columns of the field; memory segment 100A, partition "0B" 101B stores pixels in the bottom field (i.e., odd rows of the frame) which are in even rows and even columns of the field; memory segment 100B, partition "1B" 102A stores pixels in the top field (i.e., even rows of the frame) which are in even rows and odd columns of the field; memory segment 100B, partition "1B" 102B stores pixels in the bottom field (i.e., odd rows of the frame) which are in even rows and odd columns of the field; memory segment 100C, partition "2T" 103A stores pixels in the top field (i.e., even rows of the frame) which are in odd rows and even columns of the field; memory segment 100C, partition "2B" 103B stores pixels in the bottom field (i.e., odd rows of the frame) which are in odd rows and even columns of the field; memory segment 100D, partition "3T" 104A stores pixels in the top field (i.e., even rows of the frame) which are in odd rows and odd columns of the field; and memory segment 100D, partition "3B" 104B stores pixels in the bottom field (i.e., odd rows of the frame) which are in odd rows and odd columns of the field.

Figure 17:
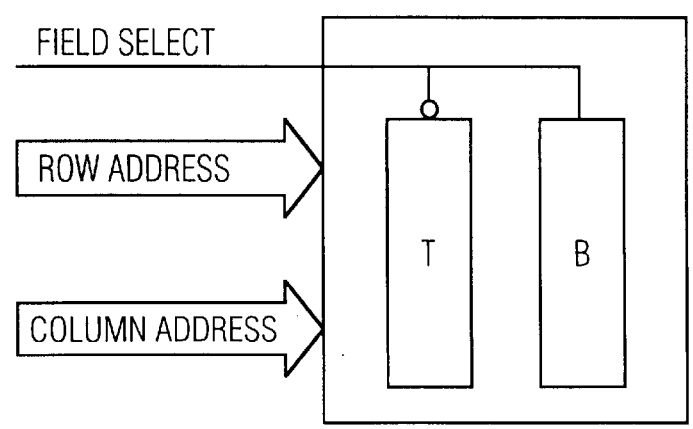
FIG. 17 shows accessing field-structured pixel data stored in partitioned memory segments in accordance with the present invention.

The present invention stores pixels in memories 100A, 100B, 100C and 100D in the foregoing manner. Thereafter, the invention accesses those pixels in a manner similar to that described above with sect to FIG. 3. FIG. 17 shows accessing of the pixels stored in partitioned memory segments in accordance with this embodiment of the invention. In this embodiment of the invention, a field select signal is applied to the memory segment, which indicates whether the top or bottom field stored therein should be selected. Also applied to the memory segment are the row and column addresses for the memory segment. These addresses are used to access pixel data stored in the memory segment partition selected by the field select signal in the manner described above with respect to FIG. 3.

Figure 18:
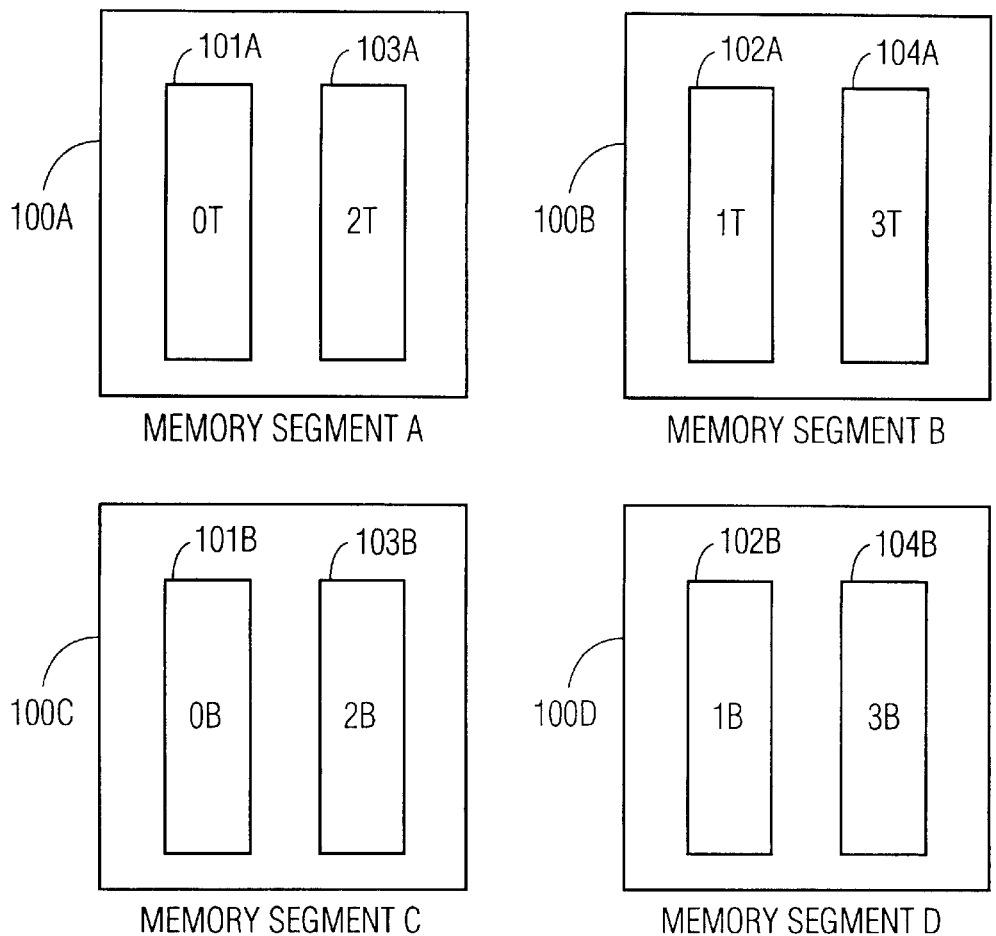
FIG. 18 shows a memory configuration used for frame prediction in MPEG-2 coded data.

For the case of frame prediction, the invention dynamically reconfigures the memory configuration shown in FIG. 16 to that shown in FIG. 18. Thus, in this case, the invention stores pixel data for all of the top field (i.e., the even rows) in memory segments 100A and 100B, and stores the pixel data for all of the bottom field (i.e., the odd rows) in memory segments 100C and 100D. In more detail, the invention stores the pixel data so that memory segment 100A, partition "0T" 101A stores pixels in the top field (i.e., even rows of the frame) which are in even rows and even columns of the field; memory segment 100A, partition "2T" 103A stores pixels in the top field (i.e., even rows of the frame) which are in odd rows and even columns of the field; memory segment 100B, partition "1T" 102A stores pixels in the top field (i.e. even rows of the frame) which are in even rows and odd columns of the field; memory segment 100B, partition "3T" 104A stores pixels in the top field (i.e., even rows of the frame) which are in odd rows and odd columns of the field; memory segment 100C, partition "2B" 103B stores pixels in the bottom field (i.e., odd rows of the frame) which are in odd rows and even columns of the field; memory segment 100C, partition "0B" 101B stores pixels in the bottom field (i.e., odd rows of the frame) which are in even rows and even columns of the field; memory segment 100D, partition "3B" 104B stores pixels in the bottom field (i.e., odd rows of the frame) which are in odd rows and odd columns of the field; and memory segment 100D, partition "1B" 102B stores pixels in the bottom field (i.e., odd rows of the frame) which are in even rows and odd columns of the field.

Figure 20:
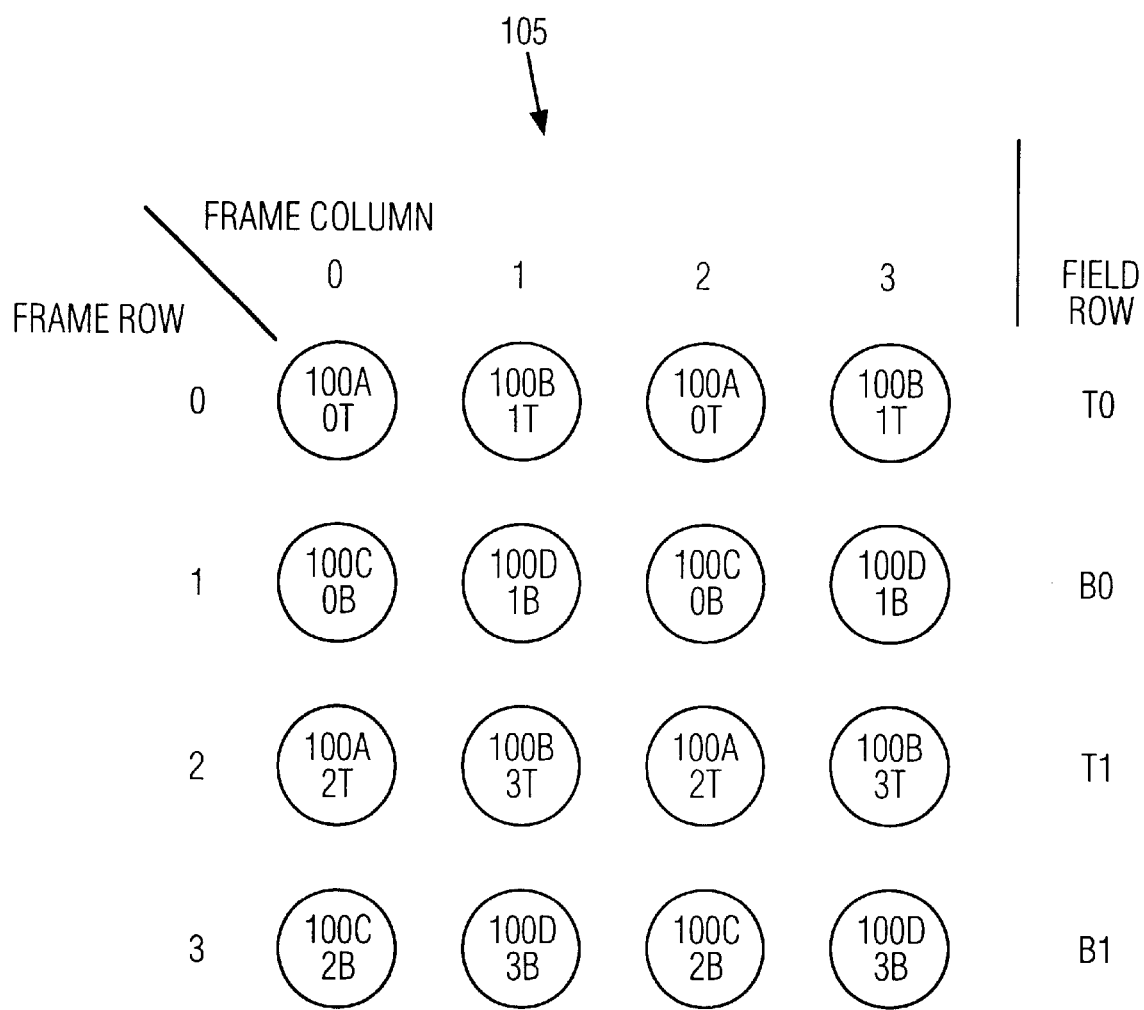
FIG. 20 explains pixel data storage for frame-structured pixel data using the second embodiment of the present invention.

The above is illustrated in FIG. 20, which shows pixels for frame 105. In this regard, "T" in FIG. 20 corresponds to the top field of frame 105 and "B" corresponds to the bottom field of frame 105. The numbers after T and B correspond to rows within the field, i.e., T0 means the 0th row of the top field, T1 means the 1st row of the top field, etc.

By comparing FIGS. 20 and 5, it is apparent that the memory configuration obtained in the foregoing manner is substantially the same as the configuration obtained by the apparatus shown in FIG. 3. That is, memory segment 100A stores data for pixels in even rows and even columns of the frame, memory segment 100B stores data for pixels in even rows and odd columns of the frame, memory segment 100C stores data for pixels in odd rows and even columns of the frame, and memory segment 100D stores data for pixels in odd rows and odd columns of the frame. Thus, the first embodiment of the invention shown in FIG. 3 is substantially a particularized application of the second embodiment, with one exception relating to accessing pixels in the partitions.

Figure 19:
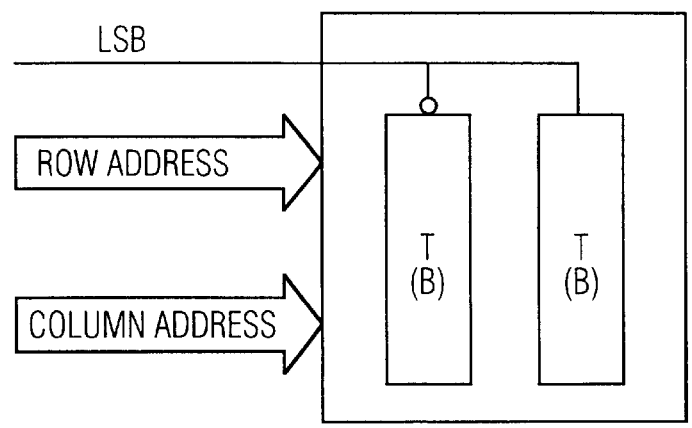
FIG. 19 shows accessing frame-structured pixel data stored in partitioned memory segments in accordance with the present invention.

In this regard, FIG. 19 shows accessing of pixel data stored in the partitioned memory segments of FIG. 18. More specifically, in this embodiment of the invention, the LSB of each row address provided to a memory segment is used to determine which partition of the memory segment to access. Addressing of particular partitions is performed in this manner so as to access pixel data from fields in the proper sequence. Remaining high order bits are then used to address actual rows of each memory segment in the manner described with respect to FIG. 3. Column addressing is also performed in the manner described above with respect to FIG. 3.

Another consideration in the implementation of the four memory segments described above (i.e., 100A, 100B, 100C and 100D) is that, in the present invention, separate row and column addresses are used to access each segment. If the number of pixels in a line, or row, of video is not equal to a power of two (e.g., 1024, 2048, etc.) and a conventional memory is used, a portion of the memory that corresponds to pixel or column addresses greater than the number of pixels and less than a next highest power of two will be unused. Since this will be the case for every line or row in a frame, a substantial portion of memory may remain unused. In order to address this problem, frame row addresses can be multiplied by the number of pixels in a row (usually a fixed number, or one of at most a few such fixed numbers) and added to the column address (which will be smaller than the above number) in order to generate a linear address for the memory. This operation may be performed in the present invention with Sect to each memory segment.

Although the present invention has been described in the motion compensation context, it is noted that the invention can be used in a variety of other contexts. For example, the invention can be used in conjunction with motion estimation performed during coding of uncoded video. This use of the invention is described below.

More specifically, determining a motion vector for a given macroblock during motion estimation is typically done by performing an exhaustive search procedure in an anchor frame. That is, the macroblock of interest is compared with a macroblock-sized pixel array in the anchor frame that is offset both vertically and horizontally by an amount less than a specified search range. An error value is then computed for a matching macroblock-sized pixel array using a "metric" that provides a measure of the size of the error. This process is performed for every possible combination of vertical and horizontal offset values within respective search ranges. The offset pair that yields the smallest error according to the metric is chosen as the motion vector for the current macroblock relative to the anchor frame. While this process yields optimal motion vectors for full-pel coding, such is not the case for half-pel coding.

Accordingly, there is a need for a way to determine half-pel motion vectors during the motion estimation process. The present invention addresses this need by providing a way to determine, at the same time, rightmost, lowermost, and lower-right diagonal half-pel values. In the motion estimation process, once the half-pel values are determined, error values for the half-pel values are computed in a well-known manner. The half-pel value yielding the smallest error is then chosen as the half-pel motion vector for the current macroblock. Thus, the present invention may be used during coding of video data, as well as during video data decoding.

The present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

What is claimed is:

1. A method of interpolating half-pels from a pixel array, the method comprising the steps of:

storing pixel data for each pixel in one of a plurality of different memory areas based on a location of the pixel within the pixel array;

a first determining step for determining a specific address in each one of the plurality of memory areas based on a target pixel in the pixel array, the first determining step determining each specific address based on a location of the target pixel in the pixel array; reading, from each the plurality of memory areas, pixel data from specific addresses determined in the determining step; and a second determining step for determining a value of at least one half-pel for the target pixel based on the pixel data read in the reading step;

wherein the reading step reads the pixel data from each one of the memory areas substantially concurrently.

2. A method of interpolating half-pels from a pixel array, the method comprising the steps of:

storing pixel data for each pixel in one of a plurality of different memory areas based on a location of the pixel within the pixel array;

a first determining step for determining a specific address in each one of the plurality of memory areas based on a target pixel in the pixel array, the first determining step determining each specific address based on a location of the target pixel in the pixel array;

reading, from each the plurality of memory areas, pixel data from specific addresses determined in the determining step; and a second determining step for determining a value of at least one half-pel for the target pixel based on the pixel data read in the reading step;

wherein the specific addresses determined in the first determining step correspond to addresses at which is stored pixel data for at least one pixel adjacent to the target pixel; and wherein the second determining step determines the value of the at least one half-pel by processing pixel data for the target pixel with the pixel data for the at least one pixel adjacent to the target pixel;

wherein the second determining step determines the value of the at least one half-pel by processing pixel data for the target pixel with pixel data for up to three pixels adjacent to the target pixel.

3. A method according to claim 2, wherein, in a case that the target pixel is located in an even row and an even column in the pixel array, a specific address for each of three pixels adjacent to the target pixel is the same as a specific address for the target pixel.

4. A method according to claim 2, wherein, in a case that the target pixel is located in an even row and an odd column in the pixel array, a specific address for a pixel vertically adjacent to the target pixel is the same as a specific address of the target pixel, and specific addresses for pixels horizontally and diagonally adjacent to the target pixel comprise a row address of the target pixel and a column address of the target pixel incremented by one.

5. A method according to claim 2, wherein, in a case that the target pixel is located in an odd row and an even column in the pixel array, a specific address for a pixel horizontally adjacent to the target pixel is the same as a specific address of the target pixel, and specific addresses for pixels vertically and diagonally adjacent to the target pixel comprise a column address of the target pixel and a row address of the target pixel incremented by one.

6. A method according to claim 2, wherein, in a case that the target pixel is located in an odd row and an odd column in the pixel array, a specific address for a pixel horizontally adjacent to the target pixel comprises a row address of the target pixel and a column address of the target pixel incremented by one, a specific address for a pixel vertically adjacent to the target pixel comprises a column address of the target pixel and a row address of the target pixel incremented by one, and a specific address for a pixel diagonally adjacent to the target pixel comprises a row address of the target pixel incremented by one and a column address of the target pixel incremented by one.

7. An apparatus for interpolating half-pels from a pixel array, the apparatus comprising:

a plurality of different memory areas which store pixel data for each pixel in the pixel array based on a location of the pixel within the pixel array;

circuitry which determines a specific address in each of the plurality of memory areas based on an address of a target pixel in the pixel array;

a plurality of multiplexers for outputting pixel data stored at each specific address in each of the plurality of memory areas; and a half-pel interpolator which determines a value of at least one half-pel for the target pixel based on the pixel data output by the plurality of multiplexers;

wherein the plurality of multiplexers output the pixel data from each one of the memory areas to the half-pel interpolator substantially concurrently.

8. An apparatus for interpolating half-pels from a pixel array, the apparatus comprising:

a plurality of different memory areas which store pixel data for each pixel in the pixel array based on a location of the pixel within the pixel array;

circuitry which determines a specific address in each of the plurality of memory areas based on an address of a target pixel in the pixel array;

a plurality of multiplexers for outputting pixel data stored at each specific address in each of the plurality of memory areas; and a half-pel interpolator which determines a value of at least one half-pel for the target pixel based on the pixel data output by the plurality of multiplexers;

wherein the specific addresses correspond to addresses at which is stored pixel data for at least one pixel adjacent to the target pixel; and wherein the half-pel interpolator determines the value of the at least one half-pel by processing pixel data for the target pixel with the pixel data for the at least one pixel adjacent to the target pixel;

wherein the half-pel interpolator determines the value of the at least one half-pel by processing pixel data for the target pixel with pixel data for up to three pixels adjacent to the target pixel.

9. An apparatus according to claim 8, wherein, in a case that the target pixel is located in an even row and an even column in the pixel array, a specific address for each of the three pixels adjacent to the target pixel is the same as a specific address for the target pixel.

10. An apparatus according to claim 8, wherein, in a case that the target pixel is located in an even row and an odd column in the pixel array, a specific address for a pixel vertically adjacent to the target pixel is the same as a specific address of the target pixel, and specific addresses for pixels horizontally and diagonally adjacent to the target pixel comprise a row address of the target pixel and a column address of the target pixel incremented by one.

11. An apparatus according to claim 8, wherein, in a case that the target pixel is located in an odd row and an even column in the pixel array, a specific address for a pixel horizontally adjacent to the target pixel is the same as a specific address for a target pixel, and specific addresses for pixels vertically and diagonally adjacent to the target pixel comprise a column address of the target pixel and a row address of the target pixel incremented by one.

12. An apparatus according to claim 8, wherein, in a case that the target pixel is located in an odd row and an odd column in the pixel array, a specific address for a pixel horizontally adjacent to the target pixel comprises a row address of the target pixel and a column address of the target pixel incremented by one, a specific address for a pixel vertically adjacent to the target pixel comprises a column address of the target pixel and a row address of the target pixel incremented by one, and a specific address for a pixel diagonally adjacent to the target pixel comprises a row address of the target pixel incremented by one and a column address of the target pixel incremented by one.

13. An apparatus for interpolating half-pels from a pixel array, the apparatus comprising:

a plurality of different memory areas which store pixel data for each pixel in the pixel array based on a location of the pixel within the pixel array;

circuitry which determines a specific address in each of the plurality of memory areas based on an address of a target pixel in the pixel array;

a plurality of multiplexers for outputting pixel data stored at each specific address in each of the plurality of memory areas; and a half-pel interpolator which determines a value of at least one half-pel for the target pixel based on the pixel data output by the plurality of multiplexers;

wherein the circuitry which determines the specific address in each of the plurality of memory areas comprises:

processing and control circuitry which outputs the address of the target-pixel;

an address bus over which the address output by the processing and control circuitry is transmitted; and one or more adders which increment the address transmitted over the address bus in response to predetermined conditions.

14. An apparatus for decoding coded video data, the apparatus comprising:

plurality of frame-store memory segments;

processing and control circuitry which receives the coded video data, which outputs a specific address of a target pixel in a frame of the coded video data, and which performs, on the coded video data, variable length decoding, inverse scanning, inverse quantization, an inverse discrete cosine transformation, and motion compensation;

circuitry which determines a specific address in each of the plurality of frame-store memory segments based on the specific address of the target pixel output by the processing and control circuitry;

a plurality of multiplexers which output pixel data stored at each specific address in each of the frame-store memory segments; and a half-pel interpolator which determines at least one half-pel for the target pixel based on the pixel data output by the plurality of multiplexers, and which outputs the at least one half-pel to the processing and control circuitry;

wherein the processing and control circuitry performs the motion compensation based on the at least one half-pel determined by the half-pel interpolator.

15. A digital television system comprising:

a tuner which is capable of receiving coded video data over one of a plurality of channels;

a video decoder which decodes the coded video data and which outputs uncoded video data;

a display processor which generates images based on the uncoded video data; and a video display for displaying the images generated by the display processor;

wherein the video decoder comprises:
  plurality of frame-store memory segments;
  processing and control circuitry which receives the coded video data, which outputs a specific address of a target pixel in a frame of the coded video data, and which performs, on the coded video data, variable length decoding, inverse scanning, inverse quantization, an inverse discrete cosine transformation, and motion compensation in order to generate the uncoded video data;
  circuitry which determines a specific address in each of the plurality of frame-store memory segments based on the specific address of the target pixel output by the processing and control circuitry;
  a plurality of multiplexers which output pixel data stored at each specific address in each of the frame-store memory segments; and
  a half-pel interpolator which determines at least one half-pel for the target pixel based on the pixel data output by the plurality of multiplexers, and which outputs the at least one half-pel to the processing and control circuitry;
  wherein the processing and control circuitry performs the motion compensation based on the at least one half-pel determined by the half-pel interpolator.

16. An apparatus for interpolating half-pels from a pixel array, the apparatus comprising:
  a plurality of different memory areas for storing pixel data for each pixel in the pixel array based on a location of the pixel within the pixel array;
  first determining means for determining a specific address in each one of the plurality of memory areas based on a target pixel in the pixel array, the first determining means determining each specific address based on a location of the target pixel in the pixel array;
  means for reading, from each the plurality of memory areas, pixel data from specific addresses determined by the determining means; and
  second determining means for determining a value of at least one half-pel for the target pixel based on the pixel data read by the reading means.

* * * * *